July 28, 1959 S. C. WURM 2,896,952

AUDIBLE SIGNAL DEVICE

Filed Aug. 1, 1955

INVENTOR.

STANLEY C. WURM

BY

Whittemore, Hulbert & Belknap

ATTORNEYS

United States Patent Office 2,896,952

Patented July 28, 1959

2,896,952

AUDIBLE SIGNAL DEVICE

Stanley C. Wurm, Detroit, Mich.

Application August 1, 1955, Serial No. 525,704

4 Claims. (Cl. 274—1)

This invention relates to signal devices and more particularly to a horn for a motor vehicle.

One object of this invention is to provide a horn for use in connection with a motor vehicle in which the sound or signal is recorded and may be a recorded voice, for example. Thus, when the horn button is pressed a recorded sound or voice emanates from the apparatus to give warning to pedestrians and other vehicles. A recorded voice may, for example, recite the name of the car, or on a commercial vehicle, it might state a name or slogan in connection with a particular product, or any other word or phrase might be recorded.

Another object of the invention is to provide a signal device of the above description in which, after each operation, the device is returned to its original or starting position so that the signal or word message is always played from the beginning.

Still another object of the invention is to provide means for assuring that the complete message or word signal is reproduced through a complete cycle even when the device is only momentarily operated.

A still further object of the invention is to provide means for playing the record signal through a complete cycle and at a speed which is audible and distinct, even though the signal device is only momentarily operated.

Other objects of the invention will become apparent as the following description proceeds, especially when taken in conjunction with the accompanying drawing wherein.

Figure 1:
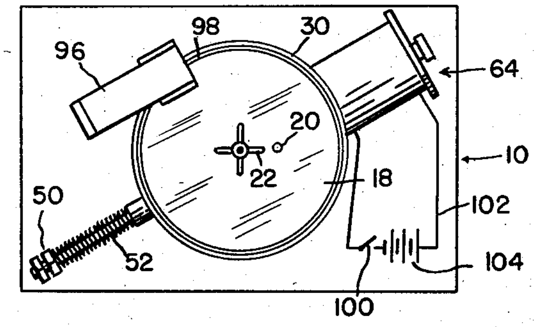
Figure 1 is a top plan view of a signal device constructed in accordance with the present invention.

Referring now more particularly to the drawing, the signal device therein illustrated is supported on a platform or support 10 and includes a post 12 secured to the support and having a reduced portion 13 at the upper end. A turntable 14 of disc shape has a central opening for receiving the reduced portion 13 and also has a sleeve 16 secured to and extending downwardly from the underside of the disc in registration with the opening therein. As seen, particularly in Figure 4, the turntable 14 and sleeve 16 are rotatably supported upon the reduced portion 13, the latter extending through the sleeve and through the opening in the turntable.

The turntable is provided to support a record 18 also of disc shape upon which sound may be recorded. The disc has a central aperture for loosely receiving the reduced portion 13 of the post and has a second opening spaced from the central aperture for receiving the pin 20 which projects upwardly from the turntable and provides for rotation of the record 18 as a unit with the turntable. Any suitable means may be provided for clamping the record down against the supporting surface of the turntable and in the present instance, a spider 22 is provided which is loosely sleeved over the reduced portion 13 and a cotter pin 24 extends through a transverse hole in the reduced portion to retain the spider, record and turntable in assembled relation on the reduced portion 13 of the post.

At the lower end of sleeve 16 is secured a gear segment 26 and this gear segment is supported upon the shoulder 28 which determines the junction between the post 12 and its reduced portion 13. The gear segment, of course, has a central opening loosely receiving the reduced portion 13 of the post and rides upon shoulder 28 with little or no friction. A suitable anti-friction washer may be provided between the shoulder and the gear segment, if desired.

The record 18 has a single endless circular groove 30 in its top surface and any sound desired may be recorded in the groove. For example, the name of a vehicle may be recorded or a warning message of some sort may be recorded to caution motorists and pedestrians.

In order to rotate the turntable and hence the record, a reciprocable member 32 is provided. The member 32 is in the form of a rectangular frame having side bars 34 and end bars 36. The rear end bar 36 of the reciprocable member has an enlargement 38 received in a yoke 40 and pivotally secured thereto by a pin 42 passing through registering openings in the legs of the yoke and in the enlargement 38, being secured to the legs of the yoke. A shaft 44 has one end threadedly secured to the yoke 40 and projects rearwardly therefrom, having a nut 45 thereon tightened against the adjacent face of the yoke. The shaft 44 extends slidably through the passage 46 in the post 48 which is secured to the support 10, and has a nut 50 threaded on the rear end of the shaft. Interposed between the nut 50 and the adjacent surface of the post 48 is a coil spring 52 encircling the shaft, being held in compression and normally urging the shaft in a rearward direction or to the left as illustrated. The strength of the spring may be varied by axially adjusting nut 50.

The front end bar of the reciprocable frame 32 has an enlargement 56 which is received in a slot 58 in the rear end of a solenoid core 60, and a pivot pin 62 extends through aligned openings in the enlargement and in the core, being secured to the core, to connect the frame member to the core. The solenoid is generally indicated at 64 and comprises the usual frame 66 and coil of wire 68 wound upon the central tubular portion 70 of the frame between the opposite flanged ends 72. The frame is secured to the support as indicated at 74. The tubular portion 70 of the frame slidably supports the core 60 for reciprocation therein.

Figures 2, 3, 4, 5:
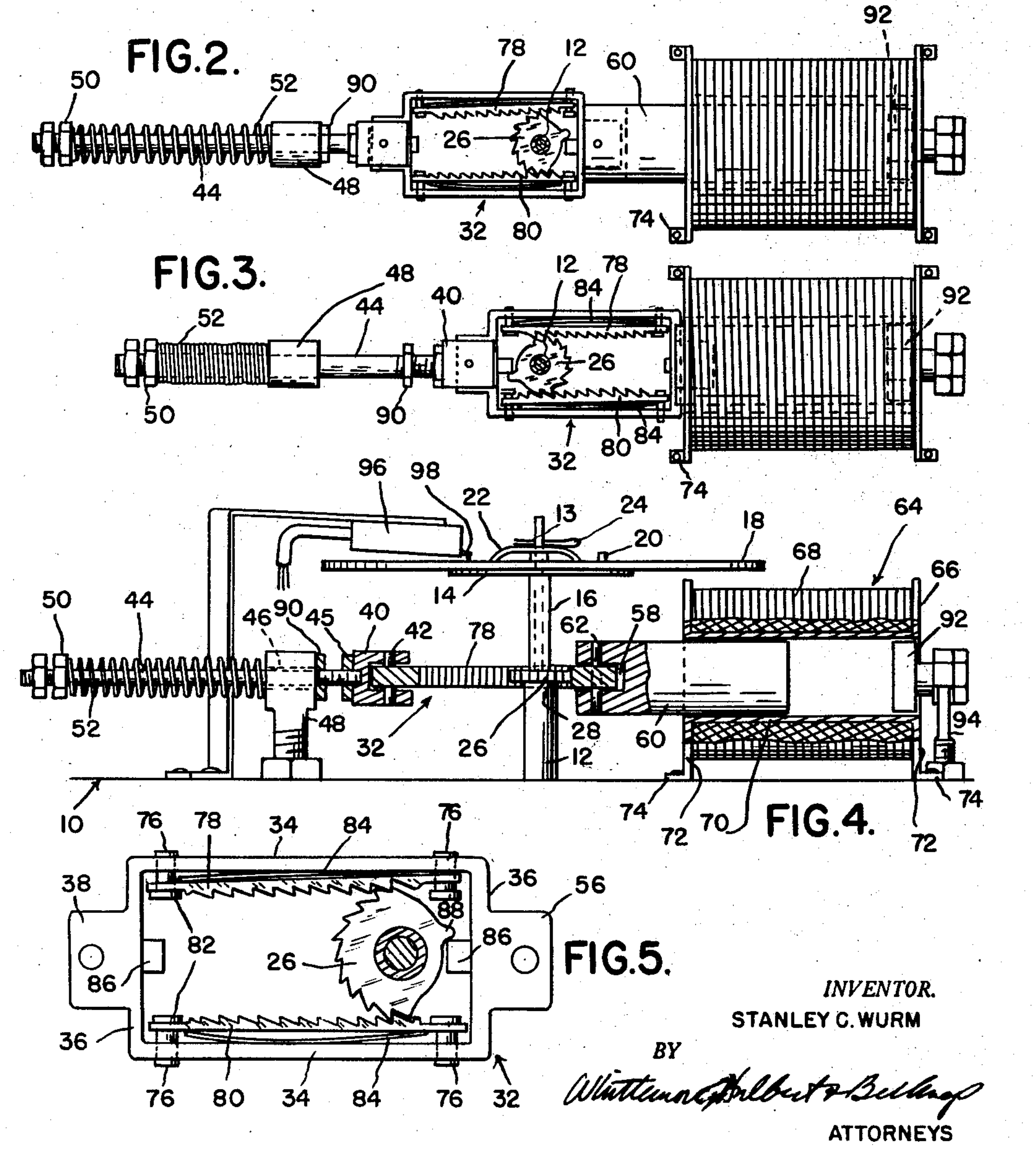
Figure 2 is an enlarged plan view of the device shown in Figure 1 with parts removed.
Figure 3 is similar to Figure 2 but shows the parts in another position.
Figure 4 is an elevational view, partly in section, of the device.
Figure 5 is an enlarged detail view of parts of the apparatus in the position shown in Figure 2.

It will be noted particularly in Figure 5 that the reciprocable frame member 32 has a pair of pins 76 secured to and projecting inwardly from each side bar 34 adjacent opposite ends thereof. Each pair of pins 76 slidably supports the opposite ends of a rack bar for movement in a horizontal direction, or laterally inwardly and outwardly with respect to the path of reciprocation of the reciprocable member. One rack bar is indicated at 78 and the other at 80. The pins 76 have heads 82 at their inner ends for retaining the rack bars. Leaf springs 84 are interposed between the rack bars and the inner surfaces of the side bars of the reciprocable frame member 32, being secured by welding to such inner surfaces and normally urging the rack bars inwardly against the heads 82 of the pins.

The rack bars are provided to mesh with the gear segment 26 and rotate the latter and hence the turntable 14.

Lugs 86 project inwardly from the inner surfaces of end bars 36 of the reciprocable frame 42 for engagement with the projection 88 of the gear segment to positively stop rotation of the gear segment at the end of each stroke of the reciprocable frame.

The reciprocatory movement of the frame 32 is limited in both directions by stops 90 and 92. The stop 90 is in the form of an axially adjustable nut threaded on the front end portion of the shaft 44 for engagement with the adjacent surface of the post 48. The other stop 92 is preferably formed of soft iron or a similar easily magnetizable metal and is located within the tubular portion of the solenoid frame 66. It is supported on a post 94 projecting upwardly from the support 10.

Any suitable sound pick-up and amplifying system may be provided. In the present instance, an electrical pick-up 96 is provided having a needle 98 for following the groove 30 of the record. The pick-up and amplifier, preferably of the electrical type, may be operated from the the ordinary motor vehicle battery. Since the construction of the pick-up and amplifying units form no part of the present invention, these units have not been illustrated in detail.

The apparatus normally assumes the position illustrated in Figure 2 under the influence of the compression spring 52 which normally urges the reciprocable frame 32 to the left in which position the limit stop 90 abuts post 48. The stop 90 may be adjusted by merely turning it with respect to shaft 44. When it is desired to sound the horn, the horn button 100 is pressed to close the circuit 102 through the vehicle battery 104 to solenoid 64 thereby energizing the latter. As a result, the core 60 of the solenoid is drawn to the right and against the limit stop 92. The core does not quite reach centered relation with respect to the coil when it engages the stop 92, and the latter, being of a magnetizable material, becomes in effect an electro-magnet to hold the core firmly against vibratory reciprocation. Movement of the core to the right similarly moves the reciprocable frame 32 to cause rack 78 to mesh with the gear segment 26 and rotate the gear segment one-half revolution. During the major portion of meshing engagement between rack 78 and gear segment 26 the teeth of the gear segment 26 are free of the rack 80. However, at the beginning of movement of the frame member 32 to the right, one or two teeth of the gear segment are engaged with the rack bar 80 and cam the latter outwardly to enable the gear segment to be rotated by rack bar 78. Then, as the reciprocable frame 32 approaches the end of its movement to the right, one or two teeth of the gear segment again engage the rack bar 80 but cam the latter outwardly to enable continued rotation thereof with the other rack bar 78 (see Fig. 3). At approximately the same time that the core 60 engages stop 92, the projection 88 upon the gear segment engages the rearmost lug 86 as illustrated in Figure 3 to prevent the gear segment 26 from overrunning.

When the horn button is released to de-energize the solenoid, the frame member 32 is moved to the left by the action of coil spring 52 to rotate gear segment 26 in the same direction. At the beginning of such movement to the left, one or two teeth of the gear segment remain in engagement with the rack bar 78 but cam the latter outwardly to enable the same to be rotated by the rack bar 80. As the reciprocable frame 32 approaches the end of its movement to the left, one or two teeth of the gear segment come into engagement with the rack bar 78, but cam the latter outwardly to enable the gear segment to continue to be rotated by rack bar 80 (see Figs. 2 and 5). At substantially the same time that stop 90 engages post 48, projection 88 on the gear segment engages the forwardmost lug 86 to prevent overrunning of the gear segment.

It is desirable to provide teeth upon the gear segment for slightly more than half of its perimeter, as shown, in order that the teeth will immediately engage with the proper rack bar at the beginning of movement of the latter. However, where the teeth are engaged with both rack bars simultaneously, as they are at each end of movement of the reciprocable frame, it is desirable to resiliently mount the rack bars so that one may be cammed outwardly when the gear segment is rotated by the other. The teeth could, of course, be continued around the entire perimeter of the gear, but in that event, one rack would be cammed outwardly during the whole course of reciprocatory movement and this would place considerable drag upon the movement.

The arrangement is such that the record is rotated for substantially one-half revolution when the solenoid is energized and is rotated in the same direction the remaining half of the revolution when the solenoid is de-energized to return the record to its starting position with respect to the pick-up needle 98 shown in Figs. 1 and 2. Thus, when the horn is blown, the recorded message will always be given from the beginning. The solenoid is sufficiently fast acting that even if the horn is only momentarily operated it will move the frame 32 to its limiting right-hand position. By employing a system wherein two separate movements of the frame 32 is provided, one upon energization of the solenoid 64 and the other upon de-energization thereof, the signal is reproduced clearly and sufficiently slowly to be distinct and audible even when the horn is only momentarily operated.

What I claim as my invention is:

1. In a signal device of the type having an endless sound track and a rotatable member operatively connected to said sound track for rotating the latter, mechanism for rotating said rotatable member in a given direction comprising a reciprocable member movable in opposite directions between limits, a gear secured to said rotatable member for rotation as a unit therewith, a rack carried by said reciprocable member at one side of said gear adapted to mesh with said gear upon movement of said reciprocable member in one direction to one limit to rotate said rotatable member in said given direction, a second rack carried by said reciprocable member at the opposite side of said gear adapted to mesh with said gear upon movement of said reciprocable member in the opposite direction to its other limit to rotate said rotatable member in said given direction, said gear having a projection thereon, and abutments on said reciprocable member respectively engageable by said projection when said reciprocable member reaches its limits of movement to simultaneously stop rotation of said gear without overrunning, said sound track being rotated one complete revolution by the movement of said reciprocable member from one limit to the other and return.

2. Mechanism as in claim 1 including means resiliently mounting said racks on said reciprocable member urging said racks toward said gear but permitting each rack to be cammed away by said gear upon rotation of the latter by the other rack.

3. A signal device as in claim 2 in which said gear has teeth around approximately one-half only of its periphery to reduce drag on one rack during rotation thereof by the other.

4. A signal device as in claim 3 having means for reciprocating said reciprocable member including a solenoid having a core connected to and reciprocable with said reciprocable member, means for energizing said solenoid to move said core and reciprocable member in one direction to one limit and spring means for moving said core and reciprocable member in the opposite direction to the other limit upon de-energization of said solenoid, said one limit comprising a stop positioned within said solenoid and magnetized by the latter to engage and hold said core when said solenoid is energized.

References Cited in the file of this patent

UNITED STATES PATENTS

| | | |
|---|---|---|
| 849,768 | Blake | Apr. 9, 1907 |
| 983,236 | Jenkins | Jan. 31, 1911 |
| 1,090,080 | Long | Mar. 10, 1914 |
| 1,177,978 | Washburn | Apr. 4, 1916 |
| 1,432,854 | Hanson | Oct. 24, 1922 |
| 1,612,607 | Cavalli | Dec. 28, 1926 |
| 1,788,584 | Murrell et al. | Jan. 13, 1931 |
| 2,362,918 | Miller | Nov. 14, 1944 |
| 2,639,924 | Bush | May 26, 1953 |
| 2,755,619 | Sheft | July 24, 1956 |

FOREIGN PATENTS

| | | |
|---|---|---|
| 274,723 | Great Britain | July 28, 1927 |
| 320,045 | France | Mar. 29, 1902 |
| 354,696 | France | Oct. 10, 1905 |